(12) United States Patent
Thorsson et al.

(10) Patent No.: US 9,289,000 B2
(45) Date of Patent: Mar. 22, 2016

(54) METHOD FOR PROCESSING ITEMS SUCH AS PIECES OF MEAT

(71) Applicant: Marel HF, Gardabaer (IS)

(72) Inventors: Brynjolfur Thorsson, Reykjavik (IS); Stefan Axelsson, Kopavogur (IS)

(73) Assignee: MAREL HF, Gardabaer (IS)

(*) Notice: Subject to any disclaimer, the term of this patent is extended or adjusted under 35 U.S.C. 154(b) by 0 days.

(21) Appl. No.: 14/503,566

(22) Filed: Oct. 1, 2014

(65) Prior Publication Data

US 2015/0019007 A1 Jan. 15, 2015

Related U.S. Application Data

(63) Continuation of application No. 13/946,357, filed on Jul. 19, 2013, now Pat. No. 8,862,262, which is a continuation of application No. 12/865,800, filed as application No. PCT/EP2009/051070 on Jan. 30, 2009, now Pat. No. 8,892,246.

(30) Foreign Application Priority Data

Feb. 4, 2008 (EP) .................................. 08002022

(51) Int. Cl.
| | |
|---|---|
| *G06F 7/00* | (2006.01) |
| *A22C 18/00* | (2006.01) |
| *A22C 17/00* | (2006.01) |
| *B65G 47/46* | (2006.01) |

(Continued)

(52) U.S. Cl.
CPC .............. *A22C 18/00* (2013.01); *A22C 17/0093* (2013.01); *B65G 47/46* (2013.01)

(58) Field of Classification Search
CPC ..... G06Q 10/087; G06Q 10/06; G06Q 10/08; A22C 17/0093
See application file for complete search history.

(56) References Cited

U.S. PATENT DOCUMENTS

| | | |
|---|---|---|
| 5,937,080 A | 8/1999 | Vogeley, Jr. et al. |
| 6,983,678 B2 | 1/2006 | Wattles et al. |

(Continued)

FOREIGN PATENT DOCUMENTS

| | | |
|---|---|---|
| DE | 3434233 A1 | 4/1985 |
| DE | 10132647 A1 | 1/2003 |

(Continued)

OTHER PUBLICATIONS

International Search Report for International Application No. PCT/EP2009/051070; Date of actual completion of the International Search: Mar. 6, 2009; Date of mailing of the International Search Report: Mar. 20, 2009.

(Continued)

*Primary Examiner* — Kyle Logan
(74) *Attorney, Agent, or Firm* — Pearne & Gordon LLP

(57) ABSTRACT

A method of processing items such as pieces of meat, by providing a stream of items by means of a primary conveyor means, allocating at least partly by means of a computer system one or more of said items to one of at least two workstations where said items are processed, e.g. cut and/or trimmed, resulting in one or more processed items, registering in said computer system information about a return of at least one of said one or more processed items to said primary conveyor means, and returning said at least one of said one or more processed items to said primary conveyor means in accordance with said information about a return, wherein the method further comprises keeping track of said items including when they are taken out and put back on the primary conveyor. The invention further relates to a processing system for carrying out the method.

27 Claims, 8 Drawing Sheets

(56) References Cited

U.S. PATENT DOCUMENTS

Figure 1:
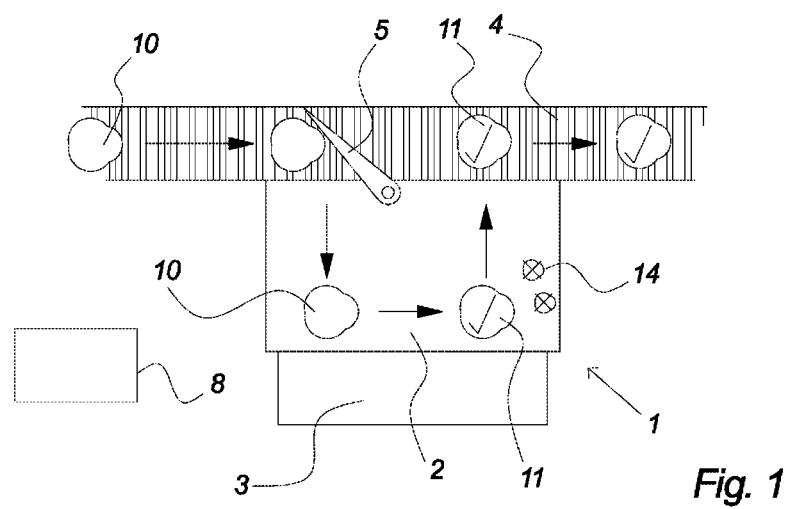

| | | | |
|---|---|---|---|
| 2003/0054749 A1* | 3/2003 | Melville | 452/157 |
| 2005/0186896 A1* | 8/2005 | Nielsen | 452/150 |
| 2007/0293980 A1 | 12/2007 | Gudjonsson et al. | |
| 2008/0144880 A1* | 6/2008 | DeLuca | 382/100 |
| 2010/0009614 A1 | 1/2010 | Hansen et al. | |

FOREIGN PATENT DOCUMENTS

| | | |
|---|---|---|
| DE | 60307440 T2 | 3/2007 |
| EP | 1289374 B1 | 7/2007 |
| GB | 2146795 A | 4/1985 |
| WO | 8300478 A1 | 2/1983 |
| WO | 9814370 A2 | 4/1998 |
| WO | 9851161 A1 | 11/1998 |
| WO | 0191565 A1 | 12/2001 |
| WO | 02068272 A1 | 9/2002 |
| WO | 03077662 A1 | 9/2003 |
| WO | 2007072508 A1 | 6/2007 |

OTHER PUBLICATIONS

European Search Report for Application No. EP 08 00 2022; Place of Search: Munich: Date of completion of Search: May 20, 2008.

* cited by examiner

METHOD FOR PROCESSING ITEMS SUCH AS PIECES OF MEAT

CROSS-REFERENCES TO RELATED APPLICATIONS

This application is a continuation of U.S. patent application Ser. No. 13/946,357 filed on Jul. 19, 2013, incorporated herein by reference, which is a continuation of U.S. patent application Ser. No. 12/865,800 filed on Nov. 8, 2010, incorporated herein by reference, which is a 371 of PCT application number PCT/EP2009/051070 filed on Jan. 30, 2009, incorporated herein by reference, which claims priority from European patent application number 08002022.5 filed on Feb. 4, 2008, incorporated herein by reference.

FIELD OF THE INVENTION

The present invention relates to a method for processing food items such as pieces of meat, e.g. carcasses or parts of pigs, calves and beeves and the like, and poultry, fish, etc., or any other food product and an apparatus for carrying out the method.

BACKGROUND OF THE INVENTION

Food processing systems comprising a number of food items being substantially sequentially delivered to a number of workstations for processing are commonly known. One example is a trim table where pieces of meat are provided sequentially by a primary conveyor band. Workstations are located along the primary conveyor, where operators can trim a piece of meat for excessive fat, bones and low-quality meat, or cut the piece to obtain a piece of predetermined weight, size or shape. The allocation of meat pieces from the primary conveyor to the workstations are in advanced systems computer controlled, thus enabling automatic sorting of pieces to workstations for different types of processing, and keeping track of the pieces for traceability purposes. When a piece of meat is processed at a workstation it typically results in one or more of a main piece of meat, and bones, fat and cut off meat, so-called trim, possibly of different qualities. According to the possible use of the different categories, one or more secondary conveyor bands, baskets, bags, trolleys or other suitable means are arranged for transporting the meat and waste away. In a typical trim table an in-feed primary conveyor is transporting meat pieces to the workstations, and e.g. three secondary conveyors typically located underneath the in-feed conveyor and table are transporting a) main pieces, b) fat and trim and c) waste, e.g. bones, away. Systems of this type are for example known from the PCT patent applications published as WO 98/14370 A2, WO 01/91565 A1 and WO 03/077662 A1.

The fact that the processed meat pieces are transported away after processing requires a second trim table or set of workstations to be arranged at the out-feed secondary conveyor if more processing steps need to be made to each piece of food. In particular when only some pieces need further processing, and where this may even not be known before allocating it to a first workstation, it becomes impractical to establish this second stage of processing at a separate location. This is further strengthened by the fact that the operators best skilled for performing the second stage of processing of a particular piece of meat, e.g. a particularly difficult cut or trimming which the operator to which the piece was initially allocated is not suited to carry out, are probably working at the first trim table for doing this particular operation already.

Alternatively, a few adjacent workstations can work together to perform several processing tasks, e.g. as disclosed in WO 01/91565 A1, where the meat items are first provided by an overhead rail system to a number of de-boning stations, and each of these de-boning stations hands the de-boned items to two adjacent slicing stations. At the slicing stations, the de-boned and sliced items are transported away by a conveyor. This configuration does facilitate two processing steps to be performed (de-boning and slicing), but in a very inflexible way. In terms of flexibility, this configuration in practice equals one workstation receiving an item from one conveyor system, performs two processing steps and delivers the resulting items to a second conveyor system.

In both the above configurations the amount of different conveyors which transport the different categories of meat, trim and waste around the factory floor makes the planning and design of a processing system difficult and inflexible. This becomes particularly significant for smaller systems with only a few workstations, where still the same amount of conveyors, and thus space, is needed as for a huge system.

Another problem with the several conveyors transporting items away from the workstations is that they are typically arranged underneath the tables for space considerations and thereby considerably more difficult to clean than the primary conveyor, and frequent, thorough cleaning is a critical requirement in food processing systems because of food hygiene considerations.

An object of the present invention is therefore to improve the flexibility of transportation means as well as enabling more processing stages in food processing systems such as e.g. trim tables.

SUMMARY OF THE INVENTION

The present invention relates to a method for processing items such as pieces of meat, comprising the steps of
    providing a stream of items 10 by means of a primary conveyor means 4,
    allocating at least partly by means of a computer system 8, 20 one or more of said items 10 to one of at least two workstations 1 where said items 10 are processed, e.g. cut and/or trimmed, resulting in one or more processed items 11,
    registering in said computer system 8, 20 information about a return of at least one of said one or more processed items 11 to said primary conveyor means 4, and
    returning said at least one of said one or more processed items 11 to said primary conveyor means 4 in accordance with said information about a return.

According to the present invention, a very advantageous method for processing food is provided, whereby it is possible to return processed items to the primary conveyor, which thereby acts as both in-feed and out-feed conveyor. Besides avoiding at least one secondary conveyor means for transporting the main pieces away from the worktables, the method of the present invention also enables processing the same piece of food at another workstation in the same processing system, e.g. trim table, thereby enabling more processing stages to be performed by a smaller and simpler processing system. Moreover, the saving of a typically well hidden conveyor for transporting main pieces away also significantly simplifies the cleaning procedures, which is an important aspect of the daily production.

By the method of the present invention, items can be taken away from the primary conveyor for processing at a workstation, and can be put back on the primary conveyor again for transportation to other workstations or post-processing systems, e.g. packaging. As required by contemporary factory owner, reseller and customer demands, the items can be tracked from the start to the end of the processing by means of a computer system, even when items change position on the conveyor because of the new possibility of putting items back. This is made possible by registering in the computer whenever an item is taken away or put back or ready to be put back on the conveyor. Several ways of registering information about a return of an item and performing the physical returning itself are within the scope of the present invention, and can be performed in any order. In a preferred embodiment, the computer system is informed when an item is processed and ready for being put back, e.g. by an operator placing the item on a scale. The computer system then plans when it will be a suitable time to put the item back, e.g. according to its knowledge of other items already present on the conveyor, and the distance between them. At the suitable time the computer system controls a local scale conveyor to transport the item onto the in-feed conveyor, which according to the present invention is also the out-feed conveyor. However, several other scenarios are possible and within the scope of the present invention and some of these are also described below.

According to the present invention, the processing method is preferably applied in a food processing system comprising several workstations, e.g. a so-called trim table, flowline or cut-up table, etc., and possibly also other processing, pre-processing and post-processing stations, e.g. registration stations, initial cut-up stations, sorting stations, quality control stations, packing stations, etc. The processed items preferably comprises pieces of meat, e.g. entire carcasses or smaller parts of pigs, calves and beeves and the like, and poultry, fish, etc., or any other food product which is typically processed individually at workstations.

The primary conveyor means is according to the present invention preferably of a conventional conveyor belt type on which items are lying while being transported in one, typical linear direction, but any suitable conveying means are within the scope of the present invention, for example a belt or rail on which items are transported in trays or baskets or held by robot grippers, or overhead rail or track systems with gambrels or so-called christmas trees. In other words, the type of conveying means should be selected according to the items to be conveyed and the overall processing tasks required, as the present invention facilitates any conveying means, as long as items can be unloaded as well as loaded by a manual operator or automatic means.

According to the present invention a stream of items generally refers to the fact that items are delivered separately as opposed to being delivered in piles or mixed together in a basket. Any suitable way of delivering items separately, i.e. as a stream of items, is within the scope of the invention, and preferably comprises delivering the items sequentially one by one by a conveyor band, but may as well comprise items distributed out in two or more parallel lines or more randomly located on any suitable conveyor means, as long as a correspondingly arranged computer system will be able to keep track of each individual item. It is noted, however, that where several items are in fact processed together, it is also within the scope of the present invention to provide such items together, e.g. arranged in baskets, and in that case the baskets are considered items according to the invention.

A computer system according to the present invention may comprise any system suitable for keeping track of the items including when they are taken out and put back on the primary conveyor, and planning their allocation to the workstations. The computer system may be specifically assigned to a single processing method according to the present invention, or it can be a central computer system controlling several systems. The computer system may be a distributed system, and/or it may be connected to other computer systems, info-terminals, PDAs, the Internet, etc., by means of any suitable electronic communication means, including wireless means, preferably a computer network.

Workstations are according to the present invention a location to and from which the items can be transported, and which are arranged for a processing of the items to be carried out. The several workstations comprised by a food processing system need not be assigned for the same processing work, e.g. deboning, trimming, filleting, cutting meat into pieces, etc., but are in fact according to the present invention preferably assigned so that one type of processing is performed at some workstations, and other types of processing is performed at other workstations. The physical workstations may be equally equipped to enable any work, and the different work allocated to them may be selected according to the different workers operating the workstations, or the workstations may physically be differently equipped and designed to better facilitate a specific processing to be carried out. The configuration of the workstations should thus be designed according to the work to be carried out at the workstation and any configuration is within the scope of the present invention. In particular, the present invention is not restricted to facilitate manual operators working at the workstation, and so is use of several operators or automated procedures using machines or robots or combinations of manual operators and machines likewise within the scope of the invention.

The allocation of items to workstations by means of the computer system refers according to the present invention to the computer controlling at least partly which workstation should process a particular item. The computer may perform the allocation all by itself according to predetermined algorithms, or a supervisor or operator may cooperate with the computer system, e.g. by performing a coarse distribution or sorting of items or adding preferences to the items in the computer system, before the computer performs the final allocation and controls the physical transport. Suitable means for doing the physical transportation from the primary conveyor to the workstation under control of the computer system should be applied, and any suitable means are within the scope of the present invention. For a conveyor means comprising a conventional conveyor belt, an example of a suitable, computer controllable transportation device is a sweeper arm which on command of the computer system can be rotated so as to extent over the width of the conveyor band at the exact right time to bar the way for a particular item which is thereby directed onto the workstation table and the sweeper arm is immediately thereafter rotated back to align the conveyor means so as to not bar further items, and if necessary sweep the item onto the desired workstation table. Other examples of suitable, computer controllable transportation devices for effectuating the allocation comprises robot grippers or suckers suitable for grabbing an item from the conveyor band and placing it on a workstation table, sweeper arms that are linearly actuated as opposed to rotated, or blowing the items off the conveyor by means of high-pressure air, but any means are within the scope of the present invention.

The processing of an item at a workstation typically results in at least a primary part of the original item being suitable for further processing or packaging. This primary part, which comprises some or the entire meat or food product of the original item, is herein referred to as a processed item. It is noted that some processing tasks involves cutting a larger item into two or more smaller items, all or some of which are suitable for further processing or packaging, and in this case one item results in two or more processed items. The processing may result in other pieces, typically in addition to the primary part, these other pieces comprising bones, fat, trim of different quality, e.g. half fat, half muscle, etc. These pieces are herein referred to as waste or secondary processed items, and may typically be thrown away, used for food products with another quality, or used for other purposes.

According to the present invention some or all of the processed items are returned, i.e. put back, to the primary conveyor means. In order for the computer system to be able to keep track of all items' whereabouts, and in particular which items are located in which sequence on the primary conveyor means, information about the return to the conveyor of a processed item has to be registered in the computer system. The order of registering the information and the physical act of returning depends on the particular configuration of the processing method, as described above. The information about a return of a processed item should at least comprise information about which item is returned, but may in addition and preferably comprise information about item characteristics, e.g. weight, and workstation characteristics, e.g. operator identification. The additional information enables the computer system to effectuate yield control on a per item per processing task basis, i.e. enabling drawing statistics about the quality or efficiency of a certain processing task, a certain workstation, a certain operator, a certain type of item, etc. These possibilities are described in more detail below. The physical return act may be performed by any suitable means, e.g. manually by an operator or automatically, e.g. by means of a bin with automatically releasable bottom, a conveyor band, a sweeper arm, etc., and any suitable means are within the scope of the invention, as long as it is possible to reliably establish accurate information about the return in the computer system, in particular regarding where the processed item is put back relative to the existing sequence of items located on the conveyor.

When said items 10 are initially registered in said computer system 8, 20 prior to said allocation, said initial item registration comprising initial item characteristics, e.g. identification numbers, origins, initial weights, initial shapes, initial compositions, associated cutting and/or trimming instructions, etc., said item characteristics being obtained by e.g. weighing, weight determination, scanning, manual inspection, tag reading, etc., an advantageous embodiment of the present invention is obtained.

According to a preferred embodiment of the present invention the initial item characteristics are obtained by an initial characteristics determining device 6, preferably a scale or a scanner, upstream the beginning of the primary conveyor 4.

When said processed items 11, 12 are registered in said computer system 8, 20 subsequent to said processing, said processed item registration comprising processed item characteristics, e.g. identification numbers, origins, processed weights, processed shapes, processed compositions, further processing instructions, etc, an advantageous embodiment of the present invention is obtained.

When said processed item characteristics are obtained at said workstations 1, e.g. by means of weight determination, scanning, manual inspection, tag reading, etc, an advantageous embodiment of the present invention is obtained.

According to the present invention, a very advantageous possibility of collecting information for each processing task, item, workstation and operator is enabled by obtaining the information at the workstations. Even when an item is sequentially processed at several workstations along the conveyor, it will be possible to know e.g. how much fat was cut off in stage 2, how fast did the operator at stage 3 perform the trimming, etc.

When said step of returning said at least one of said one or more processed items 11, 12 to said primary conveyor means 4 comprises determining an empty space on said primary conveyor means 4 suitable for receiving said returning processed items 11, 12 taking their size into account, an advantageous embodiment of the present invention is obtained.

According to a preferred embodiment of the present invention, the return to the conveyor means from a workstation of a processed or further processed item is computer controlled, which means, that the computer systems should be able to determine a space on the conveyor means where the item fits. It is important that there is enough space for each item, as the sweeper arms will not be able to separate and the weight determining devices and track keeping sensors may not be able to distinguish two items lying closely together. Therefore the measuring of processed item characteristics, e.g. weight, may include measuring the size of the item; in particular its extent in the direction parallel to the conveyor means 4. The computer system is then able to evaluate the sequence of items and processed items already on the conveyor means and see where the returning item fits with the size measured. The measurement can e.g. be made by sensors, scanners or a camera located in connection with the scale conveyor 16.

When said processed item characteristics are obtained substantially at a termination area A of said primary conveyor means 4, e.g. by means of weight determination, scanning, manual inspection, tag reading, etc., an advantageous embodiment of the present invention is obtained.

When comparison of said initial item registrations and said processed item registrations facilitates yield control and/or traceability, an advantageous embodiment of the present invention is obtained.

When after returning said at least one of said one or more processed items 11, 12 to said primary conveyor means 4 one or more of said processed items 11, 12 are again allocated by means of said computer system 8, 20 to one of said at least two workstations 1 where said processed items 11, 12 are further processed, an advantageous embodiment of the present invention is obtained.

According to this very preferred embodiment of the present invention, the processing method enables one item to be processed in several stages at different workstations even at the same primary conveyor. According to known systems, this has not been possible before, because the processed items were transported away from the workstations e.g. by secondary conveyors.

When information about a further return of one or more of said further processed items 12 to said primary conveyor means 4 is registered in said computer system 8, 20 and said further processed items 12 are returned to said primary conveyor means 4 in accordance with said information about a further return, an advantageous embodiment of the present invention is obtained.

When one or more of said at least two workstations 1 are operated by operators 13, an advantageous embodiment of the present invention is obtained.

When said step of registering information about a return is initiated by an operator 13 or by said computer system 8, 20 or a device, e.g. a scale controller, a scanner, a sensor, etc., connected to said computer system 8, 20 and said step of returning processed items is performed by an operator 13 or by said computer system 8, 20, an advantageous embodiment of the present invention is obtained.

When one or more of said workstations 1 is provided with a discard signalling device 9, 17 connected to said computer system 8, 20 for making a registration in said computer system 8, 20 that a certain item 10 or processed item 11, 12 is not returned to said primary conveyor means 4, an advantageous embodiment of the present invention is obtained.

When processing instructions are provided to said workstations 1 by said computer system 8, 20 in accordance with said allocations, an advantageous embodiment of the present invention is obtained.

When one or more of said workstations 1 are provided with an item queuing means 15, an advantageous embodiment of the present invention is obtained.

When said item queuing means 15 comprises a conveyor belt 15 or rollers, preferably a free running conveyor belt or free running rollers, preferably arranged to convey items 10, 11, 12 substantially orthogonally to the conveying direction of said primary conveyor means 4, an advantageous embodiment of the present invention is obtained.

When said primary conveyor means 4 comprises a conveyor belt 4, an advantageous embodiment of the present invention is obtained.

When one or more of said workstations 1 are provided with one or more secondary output means 18, e.g. trays, chutes, openings or bins, preferably connected to one or more secondary conveyor means 19 for collecting and/or transporting waste 14 or secondary processed items 14, e.g. bones, fat and trim of different quality, away from said workstations 1, an advantageous embodiment of the present invention is obtained.

According to the present invention, a registration of secondary processed items may also be performed in the computer system. In some systems the individual secondary processed items may not be important to register, but typically the amount of secondary processed items and waste produced by each workstation is relevant to register. This can e.g. be performed by providing a weight determining device in connection with the trays, chutes openings, etc., or a registration can be made whenever secondary items are put on the secondary conveyor(s), thereby enabling the computer to keep track of the items on the secondary conveyor(s) and weighing them at the end. The information about secondary items and waste can be correlated with the information about items and processed items in order to improve the yield control and traceability options.

When one or more of said workstations 1 are provided with a weight determining device 9, 16 for obtaining said processed item characteristics, said weight determining device 9, 16 comprising a conveyor belt 16 or other transportation device for returning processed items 11, 12 to said primary conveyor means 4, an advantageous embodiment of the present invention is obtained.

When said conveyor belt 16 or other transportation device is arranged with a termination area B above said primary conveyor means 4, an advantageous embodiment of the present invention is obtained.

When said weight determining device 9, 16 comprises a scale or an optical scanner, an advantageous embodiment of the present invention is obtained.

When said weight determining device 9, 16 automatically determines said processed item characteristics, e.g. weight, fat composition, etc., when it recognises that a processed item located in the position for weight determination does not move, an advantageous embodiment of the present invention is obtained.

When said weight determining device 9, 16 automatically initiates said information about a return registration in said computer system 8, 20 if said processed item characteristics of a currently weight determined processed item meet predetermined acceptable criteria, and awaits instructions from an operator 13 or said computer system 8, 20 if said item characteristics do not meet said predetermined acceptable criteria, an advantageous embodiment of the present invention is obtained.

When processing characteristics, e.g. time between an item enters and a processed item leaves the workstation, weight difference from entrance to exit, shape and/or composition difference from entrance to exit, etc., are obtained at one or more of said at least two workstations 1 and provided to said computer system 8, 20, an advantageous embodiment of the present invention is obtained.

When one or more of said workstations 1 are provided with an output queuing means for carrying out the step of returning said processed items to said primary conveyor means 4, said output queuing means e.g. comprising an output conveyor directed substantially orthogonally to the conveying direction of said primary conveyor means and one or more sensors for determining the positions of processed items on said output conveyor, an advantageous embodiment of the present invention is obtained.

The present invention further relates to a system for processing items such as pieces of meat, said system comprising the means essential to carry out a method according to any of the above.

THE DRAWINGS

Figure 2:
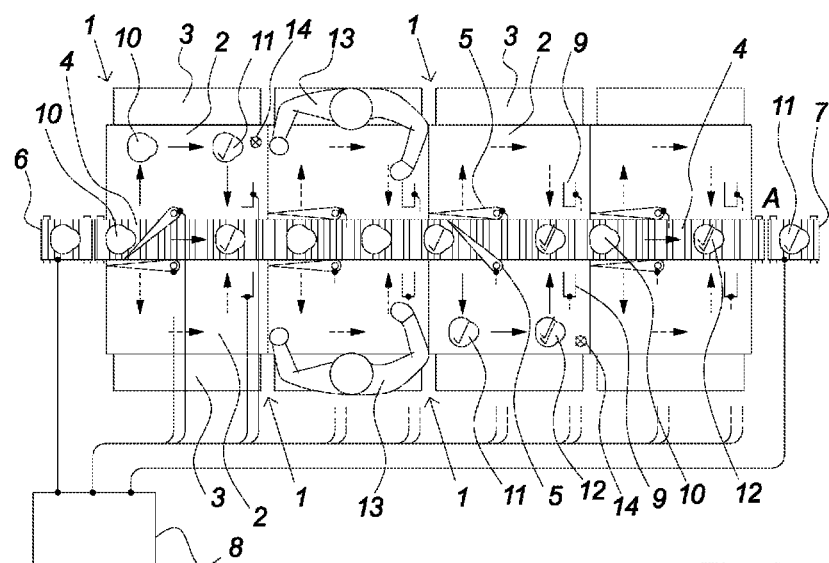
Figure 3:
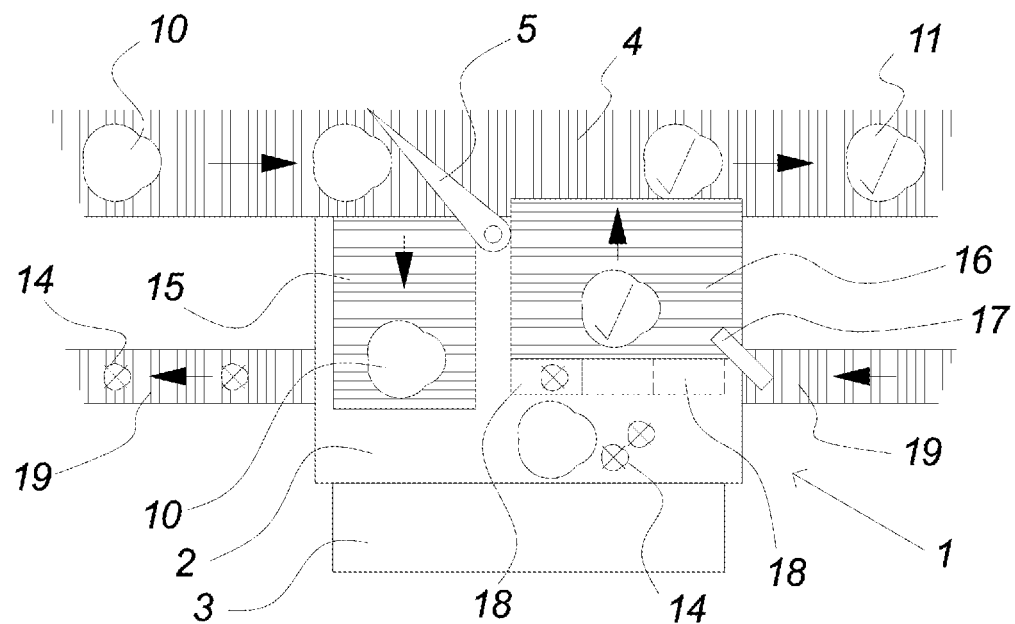
Figure 4:
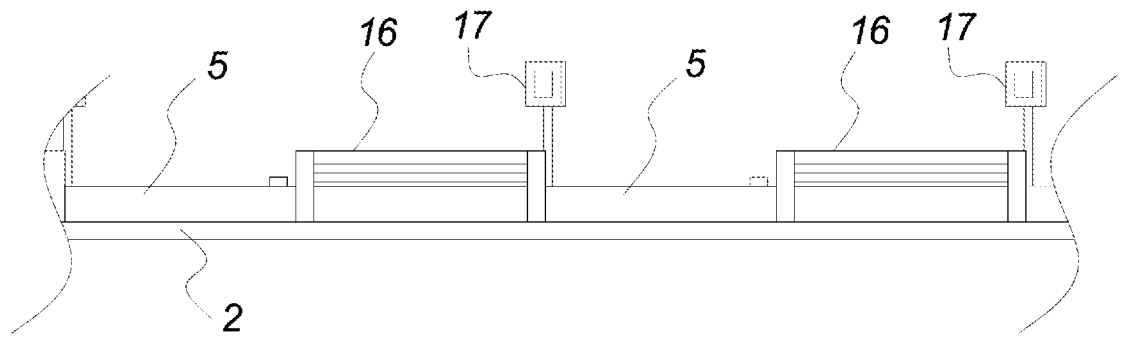
Figure 5:
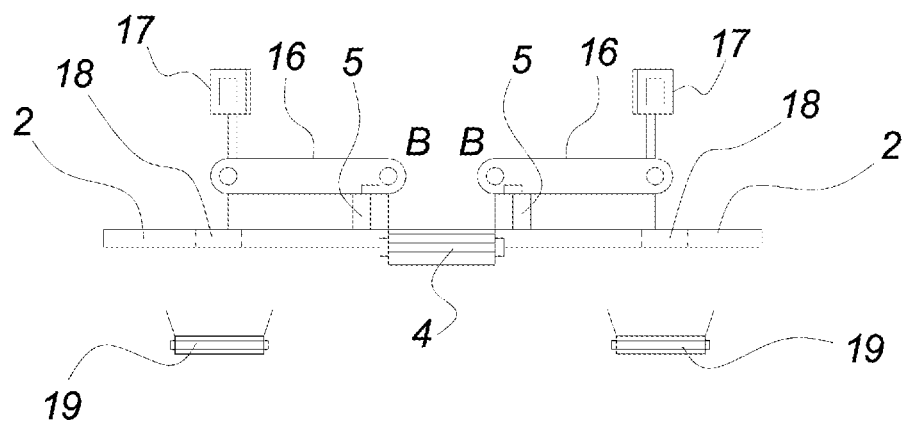
Figure 6:
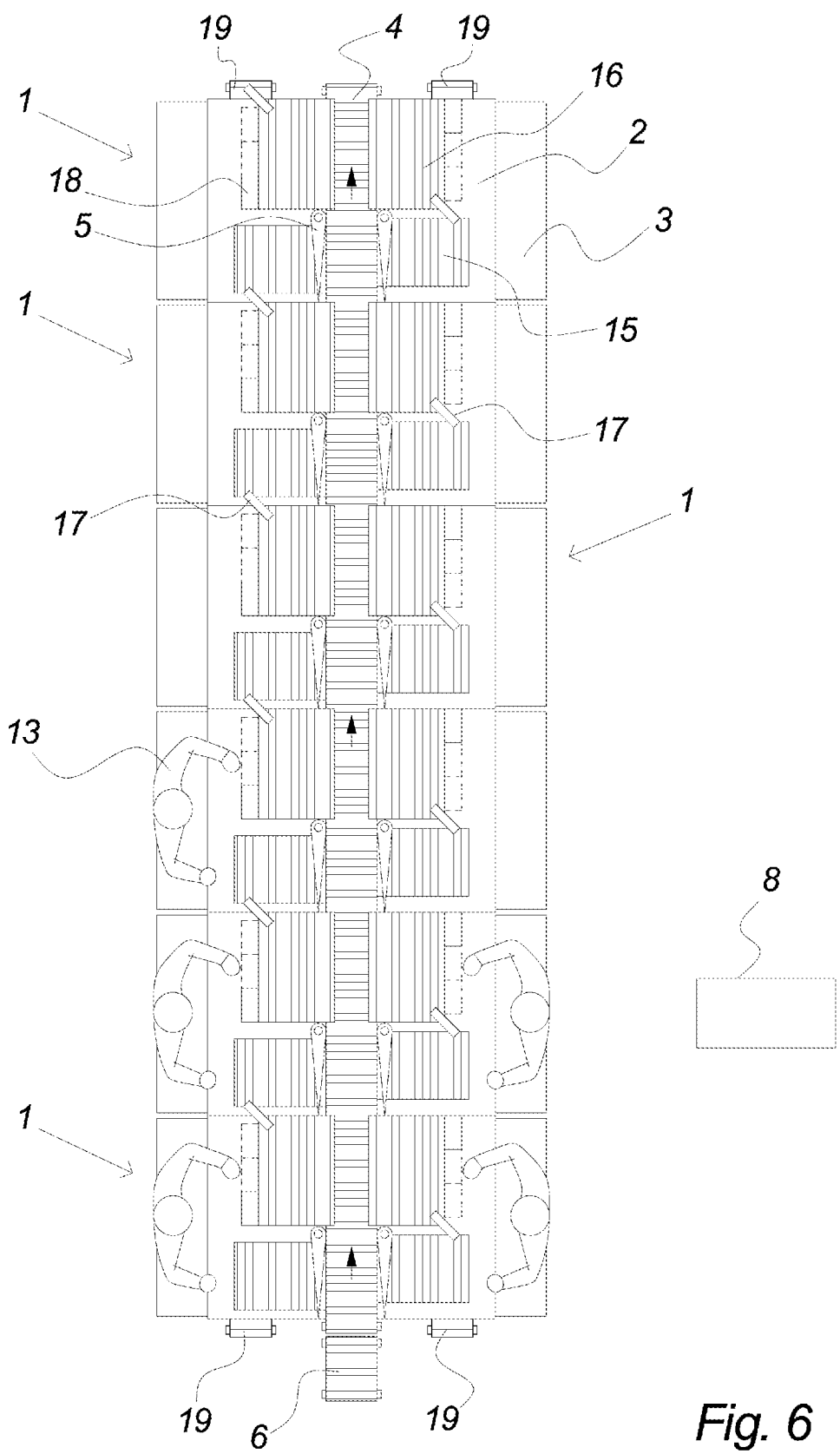

The invention will in the following be described with reference to the drawings where FIG. 1 illustrates a workstation according to an embodiment of the invention, FIG. 2 illustrates a food processing system according to an embodiment of the invention, FIGS. 3-5 illustrates a workstation according to a further embodiment of the invention, FIG. 6 illustrates a food processing system according to a further embodiment of the invention, and FIGS. 7-11 depict details of a further embodiment of the invention.

DETAILED DESCRIPTION

FIG. 1 illustrates the principles in an embodiment of the present invention as seen from above. It comprises a workstation 1 preferably comprising a workstation table 2 and a platform 3 suitable for an operator to stand on when working at the workstation table 2. The configuration of the workstation table and platform may be designed according to the work to be carried out at the workstation.

The workstation of FIG. 1 forms part of a food processing system comprising several such workstations, e.g. a so-called trim table, flowline or cut-up table, and possibly also other processing, pre-processing and post-processing stations, e.g. registration stations, initial cut-up stations, sorting stations, quality control stations, packing stations, etc. The kind of specific items being processed in a system according to the present invention is not essential and can comprise any kind of items which have to be individually processed during production, e.g. slaughtered animals, e.g. pigs, beeves, calves, fish, poultry, etc., in any stage of processing, i.e. entire carcasses, half, quarter or smaller parts of carcasses, small parts ready for trimming, filleting or portion cutting, etc. The several workstations comprised by a food processing system need not be assigned for the same processing work, but are in fact according to the present invention preferably assigned so that one type of processing is performed at some workstations, and other types of processing is performed at other workstations.

FIG. 1 further illustrates a conveyor means 4 arranged to carry items 10 and processed items 11, to, past and/or from the workstation. The conveyor means is illustrated as a conventional conveyor belt, on which items are lying while being transported in one, typical linear direction, but any suitable conveying means is within the scope of the present invention A computer system 8 keeps track of the items 10 and processed items 11 which are being transported by the conveyor means 4. In particular, the computer system 8 should keep track of the sequential positioning of each item and processed item, but further information may be processed by the computer system, e.g. the exact physical positions of the items and processed items, characteristics of the items and processed items, e.g. weight, bone, fat and meat distribution, shape, quality, colour, etc., predetermined or dynamically determined sorting, processing and packaging parameters associated with each item and processed item, traceability information, i.e. information about origin of each item and processed item to a certain, predetermined extent, e.g. the country of origin, the farm, the batch, the specific animal, etc. In order to improve the tracking of items on the conveyor means, suitable sensors may be provided along the conveyor means to monitor the precise positions of items, and/or a tachometer or other suitable device may be provided to monitor the real speed of the conveyor means. Also cameras, scanners, tag readers, etc., may be employed for tracking the items.

In FIG. 1 is as mentioned above illustrated using a conventional conveyor belt for conveying means 4, and in that case a suitable device for unloading items comprises a sweeper arm 5, preferably controlled by the computer system 8. When the items should go past the workstation 1, the sweeper arm 5 is lying stationary along the conveyor belt not interfering with the transportation of items. On the other hand, when an item should be unloaded to the workstation 1, the sweeper arm 5 is rotated so as to extend over the full width of the conveyor means 4 as illustrated in FIG. 1 and thereby bar the transportation of an item 10, which is instead directed onto the workstation table 2.

As mentioned above, the items 10 may comprise any kind of food in any stage of processing. In a preferred embodiment, the items 10 comprise pieces of meat which have to be trimmed for excessive fat, and in order to comply with a predetermined weight range. The processing, e.g. cutting, trimming, filleting, shaping, etc., performed at the workstation 1 typically results a processed item 11 and one or more pieces of waste or secondary processed items 14, e.g. fat, meat with too much fat in it, or meat of lower quality. In some processes, e.g. simple cutting up of big meat chunks, the processing results in two or more processed items 11, possibly with no waste or secondary processed items 14.

When the relevant processing has been carried out, the processed items 11 are returned to the conveyor means 4. In the principle embodiment of FIG. 1 no specific means for this return are shown, as any suitable means, including manual loading, is within the scope of the present invention. According to the present invention, when the system is started, the conveyor means 4 will typically only comprise items 10 that are not processed. After some time, when some items have been processed at the workstation 1, the conveyor means 4 may comprise both non-processed items 10 and processed items 11, and if some items are passing the workstation 1 on the conveyor means without being processed by that workstation, the conveyor means will comprise a mix of non-processed and processed items, or more accurately items which has been processed to different extents. For each item or processed item being returned to the conveyor means 4 from the workstation 1 a registration should be made in the computer system 8 to keep the register of items on the conveyor accurate at all times. Apart from carrying on the further information that may be comprised in the computer system about that item before the processing, the registration can be made with any suitable detail, ranging from simply inserting an item reference number of the returned item between the two relevant items already on the conveyor, over updating existing information, e.g. about initial weight, shape, fat distribution, etc., to adding new information about weight, shape, any trimming or cutting performed, further traceability information such as operator name, etc., further processing parameters, etc. The registration in the computer system should also be able to handle when an item is cut into two or more processed items which all are returned to the conveyor, as opposed to the secondary processed items 14 or waste which is typically handled by other means, e.g. baskets or a separate, secondary conveyor.

The registration in the computer system 8 about the return of a processed item to the conveyor can be made automatically, e.g. by a sensor monitoring any items being loaded onto the conveyor from the workstation 1, or manually, e.g. by the operator pushing a button each time he returns an item to the conveyor. The return itself, i.e. the loading onto the conveyor, can also be performed either automatically or semi-automatically by means of a transverse transportation means, another sweeping arm, a robot gripper, a tray with computer controlled release mechanism, etc., or it can be done manually or semi-automatically by having the operator simply laying the processed items on the conveyor or in a chute leading to the conveyor.

FIG. 2 illustrates a food processing system, e.g. a flowline or trim table, comprising several workstations 1 as the one described with reference to FIG. 1. As described above, each workstation 1 preferably comprises a workstation table 2, a platform 3 for an operator 13 to stand on and a sweeper arm 5. The workstations 1 are arranged on both sides along a conveyor means 4. In the configuration of FIG. 2 all workstations are illustrated as being substantially equally configured, and symmetrically located along the conveyor. It is noted, however, that any configurations, e.g. including different types of workstations for different processing tasks, or parts of the conveyor means 4 not being associated with any workstations, etc., are within the scope of the present invention. Moreover, the conveyor means 4 needs not be linearly arranged as in FIG. 2 within the scope of the present invention. The sweeper arms 5 are each connected to a computer system 8, which keeps track of the items as described above, and is thereby able to control which items should be unloaded to which workstations at which times.

In FIG. 2 is illustrated each workstation being equipped with a computer registration device 9 e.g. for obtaining information about a return of a processed item to the conveyor means 4 as described above, and sending this information to the computer system 8.

The food processing system in FIG. 2 further comprises an initial characteristics determining device 6, e.g. comprising a short conveyor band arranged together with a scale to establish the weight of an item 10 being transported by the initial characteristics determining device. Any suitable initial characteristics determining devices are within the scope of the present invention, e.g. scales, scanners, sensors, manual inspection, etc., are within the scope of the invention, as well as any combinations thereof. The initial characteristics determining device 6 is connected to the computer system 8, e.g. in order to establish the initial register of the sequence of items, preferably together with additional information, e.g. initial item weights, initial shapes, initial bone, fat and meat distributions, initial sizes, etc. Instead of an initial characteristics determining device, the same information may be obtained from a pre-processing system, e.g. a sorting system, coarse cutting system, etc., whereby the initial characteristics determining device can be dispensed with. The information available in the computer system when items 10 are provided to the conveyor means 4 should be sufficient to keep track of the sequence of items, but should in a preferred embodiment also keep track of associated weights, traceability information, planned processing steps, etc. In a food processing system where the workstations are configured for different processing, e.g. by different arrangements or different operators with different skills, the computer systems should preferably also have access to such information in order to control the allocation of items to the relevant workstations by means of the sweeper arms 5 or other distribution means. When the computer system knows both the sequence of items as well as the available processing means, i.e. differently configured workstations, it can plan the process most efficiently with respect to speed, quality, other aims, or compromises thereof.

FIG. 2 further illustrates final characteristics determining device 7 arranged at the termination area A of the conveyor means 4. The final characteristics determining device 7 may comprise any of the devices mentioned as suitable for the initial characteristics determining device 6, but need not be the same in a specific configuration. The final characteristics determining device 7 is connected to the computer system 8 in order to obtain information about the items when they leave the processing system, e.g. information about final weights, final shapes, final distributions of bone, fat and meat, final colour, etc. This information may be used by the computer system 8 for comparing with the initial information obtained from the initial characteristics determining device 6 and from the computer registration device 9. As the computer system 8 has been keeping track of the items during the processing, the computer system knows which item measured by the final characteristics determining device 7 compares to which item measure by the initial characteristics determining device 6, and/or the computer registration devices 9. This information is preferably used for yield control, i.e. determining how much each item has been decreased due to e.g. trimming, how accurate the processing has been performed, etc. This can be used for overall quality and efficiency measurements and improvements, as well as for specific operator quality and efficiency measurements. The information obtained by the final characteristics determining device 7 may further be used in post-processing tasks, e.g. packing, sorting, further processing, etc.

For an embodiment of the present invention to work, basically only the keeping track of items' position in the sequence, taking into account items being "out" for processing at the different workstations is necessary. The initial characteristics determining device 6 or other means for obtaining information at earlier stages facilitates planning the allocation of items to relevant workstations, and/or instructions towards the specific processing needed for each item. The final characteristics determining device 7 or other means for obtaining information at subsequent stages facilitates yield control for efficiency and quality measurements, as well as planning subsequent stages. The computer registration devices 9 may be used instead of either the initial or the final characteristics determining devices 6 or 7, or may be applied in addition thereto, to obtain even more detailed information, or to minimise the risk of item sequence errors.

A particularly advantageous possibility facilitated by the present invention whereby processed items are returned to the same conveyor means 4, is the possibility of allocating an already processed item 11 to a downstream workstation for even further processing. This concept is illustrated in FIG. 2 where a processed item 11 is allocated to a workstation 1 and processed, resulting in a further processed item 12, which is again returned to the conveyor means 4. The conveyor means 4 may thus after a while be transporting items of different degrees of processing, but as every necessary information, e.g. the unloading and loading of items on the conveyor means is registered in the computer system, it is possible to keep track and always know which items are finished being processed, and which items need more processing. In principle, by arranging the conveyor means long enough or travelling slowly enough, it is possible to have as many separate processing steps as necessary.

FIG. 3 illustrates a workstation 1 according to an embodiment of the invention in more detail. It comprises a workstation table 2 and preferably a platform 3. A conveyor means 4 transports items 10 and processed items 11 to, past and/or from the workstation 1. The allocation of an item to the workstation is performed by means of a sweeper arm 5 controlled by a computer system. An item 10 may be allocated to the workstation, processed, e.g. by an operator, resulting in one or more processed items 11 and possibly waste and/or secondary processed items 14. In a preferred embodiment one or more bins, chutes, trays, openings 18 or other means are provided for the operator to get rid of waste and/or secondary processed items 14. In a preferred embodiment one or more secondary conveyors 19 are provided, preferably underneath the workstations, preferably parallel to the conveyor means 4, for transporting waste and/or secondary processed items 14 away.

In a preferred embodiment of the invention, a weight determining device 16, e.g. corresponding to a computer registration device 9 described above with reference to FIG. 2, e.g. comprising a scale, is provided with a short conveyor band with a direction transverse to the direction of the conveyor means 4. When a processed item 11 is placed on the weight determining device 16, information about the processed item 11 can be obtained and transmitted to the computer system. As the computer system itself allocated the item for the workstation by means of the sweeper arm 5, the computer system knows which processed item is on the scale. When the processed item 11 should be loaded onto the conveyor means 4 the short conveyor band transports it forward until it falls down on the transverse conveyor means 4. The short conveyor of the scale 16 may be manually or automatically operated. If manually operated, a sensor or button should be used to inform the computer system about the exact time the processed item is returned to the conveyor means 4. If automatically operated, the computer system because of its keeping track of the items knows when a suitable empty space is available on the conveyor means 4, and drops the processed item 11 accordingly, and can in that case make the registration of the return automatically, or, in other words, the planning of when to drop the processed item on the conveyor means 4 can be seen as the registration of a return itself.

In a preferred embodiment of the invention, a display, preferably with touch screen or buttons 17 is provided at each or some workstations. This display may be used for the computer system to show the operator instructions related to the processing, e.g. a text explaining how to cut or a graphical view of a certain cut, information about the current or next items to be processed, information about the calculated yield in terms of efficiency or quality, etc. The display may further comprise buttons either integrated in the display as a touch screen or provided somewhere else within reach of the operator, or other kind of input device, e.g. a keyboard, proximity sensors, infrared sensors, a bar code reader, RFID tag reader or chip reader, etc. Thereby is facilitated that the operator can provide further information to the computer system. When no automatic loading of processed items is provided, the operator may use the buttons to signal to the computer system when a processed item is put on the conveyor means 4. Other use of the buttons may include signalling to the computer system that the item is discarded, i.e. that no processed item is available for return to the conveyor means 4. In that case, the computer system should remove that item from the track keeping register. The operator may be enabled to signal to the computer system which kind cut-off he is making, i.e. waste, bones, fat, meat with excessive fat, etc. The operator may also be able to signal to the computer that he has parted a single item into two or more processed items, in which case the track keeping register should split the relevant one item into two or more. The operator may also be able to signal to the computer that further processing of a particular item is needed, or that he is not skilled to do the requested processing, or that he needs a break and the computer therefore should stop allocating items to his workstation. Likewise is any further suitable use of communication between the workstations and the computer system within the scope of the present invention.

In a preferred embodiment of the present invention, the workstation comprises a queuing means 15 for facilitating a queue of items to build up at the workstation without becoming a mess, and without the computer system loosing track of the item sequence. The queuing means preferably comprises a free rolling conveyor band or rollers without motor drive or braking means, whereby each new item delivered to the queuing means 15 by the sweeper arm 5 causes any existing items to be moved forward with very limited friction. Thereby the items are not piling up or getting mixed and any fragile surfaces are not damaged. The length of the queuing means should correspond to the number of items which would possibly be queued at a workstation when taking into consideration the typical size of the items.

It is noted that several of the above-mentioned features are not necessary for a simple form of the present invention to work and so is any combination of or leaving out in particular queuing means 15, display 17, openings 18, secondary conveyor 19, scale with conveyor 16, etc., within the scope of the present invention.

FIG. 4 illustrates an embodiment of the present invention as described above with reference to FIG. 3 as seen from the side transverse to the direction of the conveyor means 4, i.e. as seen from an operator's point of view. Due to clarity not all features of FIG. 3 are shown. It shows a workstation table 2, a sweeper arm 5, a weight determining device 16, preferably a scale with a conveyor band, and a display 17. FIG. 4 illustrates the relative vertical displacement and the vertical extents of the features of a preferred embodiment, though noting that any displacements and extents are within the scope of the present invention. The height of the above surface of the scale 16 is selected so that items will drop down onto the transverse conveyor means 4. The vertical displacement of the display 17 should be selected for easiest use by the operator, and should preferably be adjustable or at least tiltable and pivotable.

FIG. 5 illustrates an embodiment of the present invention as described above with reference to FIGS. 3 and 4 as seen from the side parallel to the direction of the conveyor means 4. Due to clarity not all features of FIG. 3 are shown. It shows workstation tables 2 on both sides of the conveyor means 4, and sweeper arms 5, weight determining devices 16, and displays 17 associated with each workstation. FIG. 5 further illustrates a possible location of the openings 18 for waste and/or secondary processed items and underlying secondary conveyors 19. FIG. 5 illustrates the relative vertical displacement and the vertical extents of the features of a preferred embodiment, though noting that any displacements and extents are within the scope of the present invention. The horizontal extent and displacement of the scale conveyor band 16 is selected so that the scale conveyor termination area B protrudes out over and above the conveyor means 4 so that items will drop down onto the conveyor means a suitable distance from the edge thereof.

FIG. 6 illustrates an example of a food processing system using the workstations 1 described above with reference to FIGS. 3-5. As described above, each workstation 1 preferably comprises a workstation table 2, a platform 3 for an operator 13 to stand on and a sweeper arm 5. The workstations 1 are arranged on both sides along a conveyor means 4. In the configuration of FIG. 6 all workstations are illustrated as being substantially equally configured, and symmetrically located along the conveyor. It is noted, however, that any configurations, e.g. including different types of workstations for different processing tasks, or parts of the conveyor means 4 not being associated with any workstations, etc., are within the scope of the present invention. Moreover, the conveyor means 4 needs not be linearly arranged as in FIG. 2 within the scope of the present invention. The sweeper arms 5 are each connected to a computer system 8, which keeps track of the items as described above, and is thereby able to control which items should be unloaded to which workstations at which times.

The workstations in FIG. 6 further comprise a queuing means 15 for receiving a number of items for processing, and one or more openings 18 preferably in connection with one or more secondary conveyors 19 for transporting waste and/or secondary processed items, e.g. fat, away from the workstations. Further, the workstations comprise a scale 16 arranged with a conveyor as described above, and a display 17, which preferably comprises means for input, e.g. a touch screen or buttons as described above. In FIG. 6 is illustrated different locations of the displays 17 relative to the workstations 1, and it is recognised that any suitable locations are within the scope of the present invention. The same applies to the general layout and configuration of the workstations, in that, even for workstations configured to perform the same processing tasks, the different elements may be placed different for various purposes. In FIG. 6 the workstation layouts are mirrored by the conveyor means 4 in the centre so that operators on the left side of the conveyor means 4 have the queuing means at their right and work from right to left, whereas operators on the right side of the conveyor means have their queuing means to their left, thus working from left to right. Other possibilities comprise having equal layout on both sides so that all operators work from left to right or vice versa, or laying the individual workstations out according to the wishes of the operators working there, or the obvious configuring workstations aimed at different processing tasks differently.

In the embodiment of FIG. 6 the scales 16 performs the act of obtaining information about a return of a processed item to the conveyor means 4, and sending this information to the computer system 8, preferably together with information about the new weight of the item enabling yield control.

The food processing system in FIG. 6 further comprises at the entrance of the conveyor means 4 an initial characteristics determining device 6, e.g. comprising a short conveyor band arranged together with a scale to establish the weight of an item 10 being transported by the initial characteristics determining device. Any suitable initial characteristics determining devices are within the scope of the present invention, e.g. scales, scanners, sensors, manual inspection, etc., are within the scope of the invention, as well as any combinations thereof. The initial characteristics determining device 6 is connected to the computer system 8, e.g. in order to establish the initial register of the sequence of items, preferably together with additional information, e.g. initial item weights, initial shapes, initial bone, fat and meat distributions, initial sizes, etc. Instead of an initial characteristics determining device, the same information may be obtained from a pre-processing system, e.g. a sorting system, coarse cutting system, etc., whereby the initial characteristics determining device can be dispensed with. The information available in the computer system when items 10 are provided to the conveyor means 4 should be sufficient to keep track of the sequence of items, but should in a preferred embodiment also keep track of associated weights, traceability information, planned processing steps, etc. In a food processing system where the workstations are configured for different processing, e.g. by different arrangements or different operators with different skills, the computer systems should preferably also have access to such information in order to control the allocation of items to the relevant workstations by means of the sweeper arms 5 or other distribution means. When the computer system knows both the sequence of items as well as the available processing means, i.e. differently configured workstations, it can plan the process most efficiently with respect to speed, quality, other aims, or compromises thereof.

It is recognised that even though a final characteristics determining device arranged at the termination area of the conveyor means 4 is not shown in FIG. 6, the embodiment of FIG. 6 could comprise such a final characteristics determining device as described above with reference to FIG. 2. In a preferred embodiment, however, the scale 16 or other weight determining device at each workstation 1 is sufficient for keeping track of the items and producing sufficient data for yield control and traceability, whereby a common scale at the end of the conveyor is not necessary. In fact the configuration of the embodiment of FIG. 6 having a scale at each workstations offers better yield control, as data can be obtained for each individual operator and/or processing task, even when exploiting the possibility of performing multiple processing tasks on the same item at the same conveyor, which is only enabled by the present invention.

Figure 7:
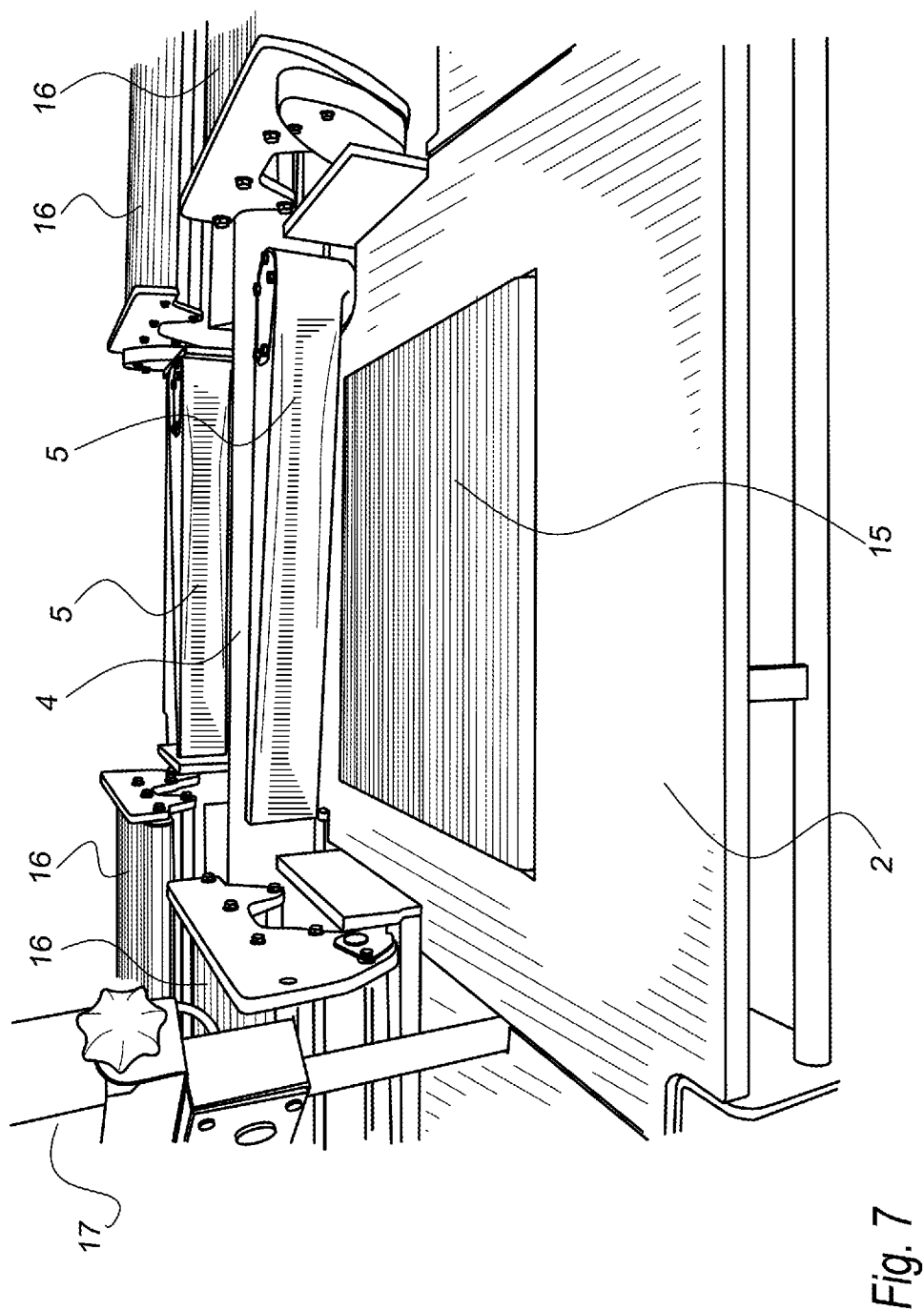

FIG. 7 depicts some details of an embodiment of the present invention in general according to the embodiment illustrated in FIGS. 3-6. It shows approximately the half width of a workstation table 2 comprising a sweeper arm 5 and a queuing means 15 configured with a free rolling conveyor band as described above. At each side, parts of scales with conveyors 16 are visible, and to the left a part of a display 17 is visible. Behind the sweeper arm 5 can be seen the conveyor means 4, and opposite sweeper arm and scales. In the embodiment of FIG. 7 the conveyor means 4, the queuing means 15 and the workstation tables 2 are all at substantially the same vertical level, which is preferred, but differentiations are also within the scope of the invention.

Figure 8:
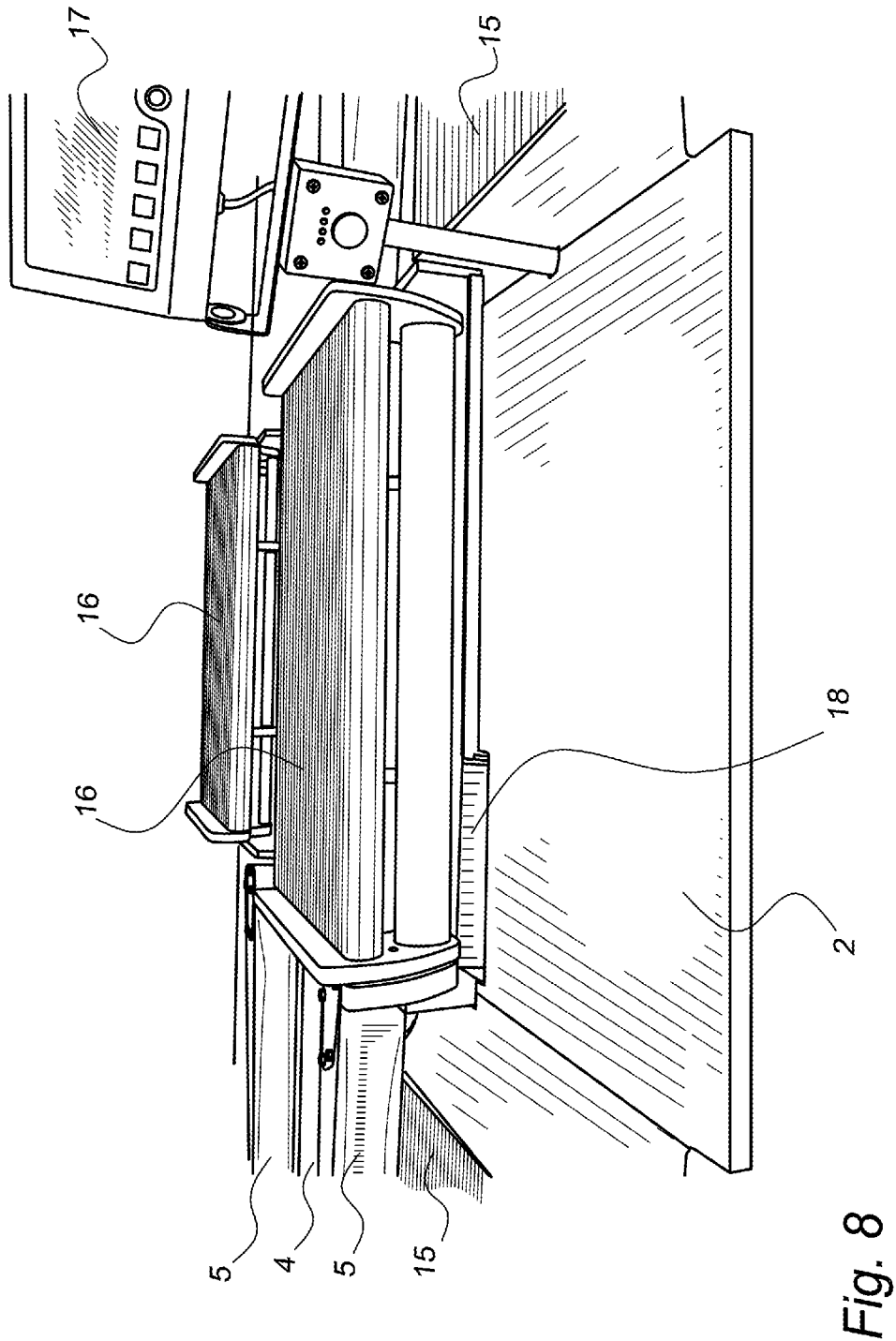

FIG. 8 depicts further details of an embodiment of the present invention in general according to the embodiment illustrated in FIGS. 3-6. It shows approximately the half width of a workstation table 2 comprising a scale with conveyor 16, a display 17 and an opening 18 for dismissing waste and/or secondary processed items such as fat. At the sides can be seen parts of sweeper arms 5 and queuing means 15, as well as the conveyor means 4.

In the embodiment of FIG. 8 the display 17 comprises a touch screen display which enables programmatically providing relevant input functions, e.g. buttons, keyboard, etc., but it additionally comprises real buttons, too, e.g. for input functions which should definitely always work. As seen, the vertical level of the scale conveyor 16 is above the conveyor means 4, thereby enabling items to be dropped down on the conveyor means 4 for improved handing over. The conveyor 16 is horizontal so that it is also raised above the level of the workstation table 2 in the embodiment of FIG. 8. It is noted, however, that any other suitable configurations of scale and conveyor 16 are within the scope of the present invention, e.g. having the conveyor 16 slope from table level to the advanced level above the conveyor means 4.

Figure 9:
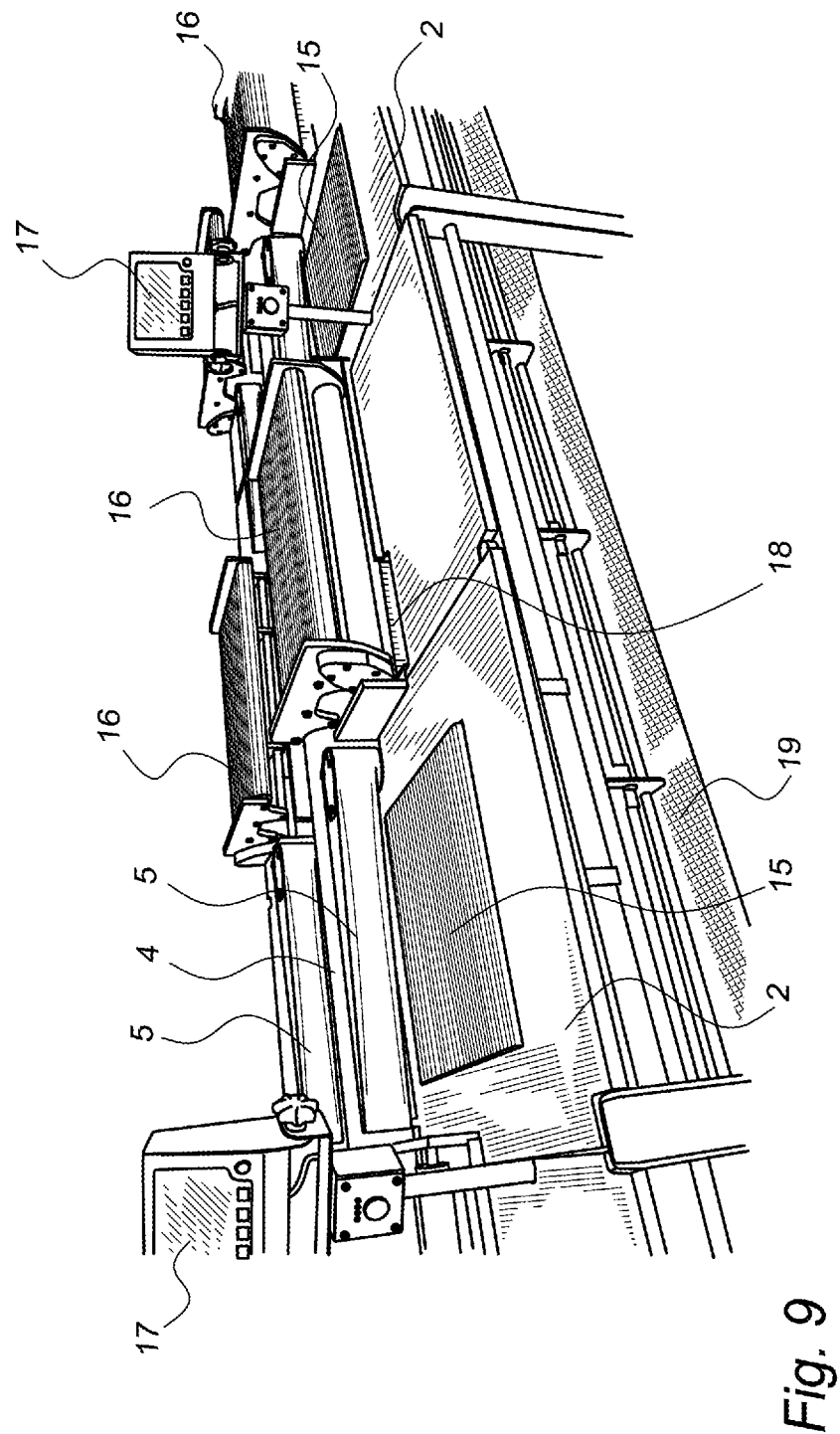

FIG. 9 is an overview of an entire workstation as described in detail above with reference to FIGS. 7 and 8, comprising the same features. In FIG. 9 can also bee seen part of a secondary conveyor means 19 running beneath the workstation table 2 for transporting away secondary processed items which the operator dumps through the opening 18. FIG. 9 also implies that the displays can be tilted and turned to best suit the individual operating the workstation.

Figure 10:
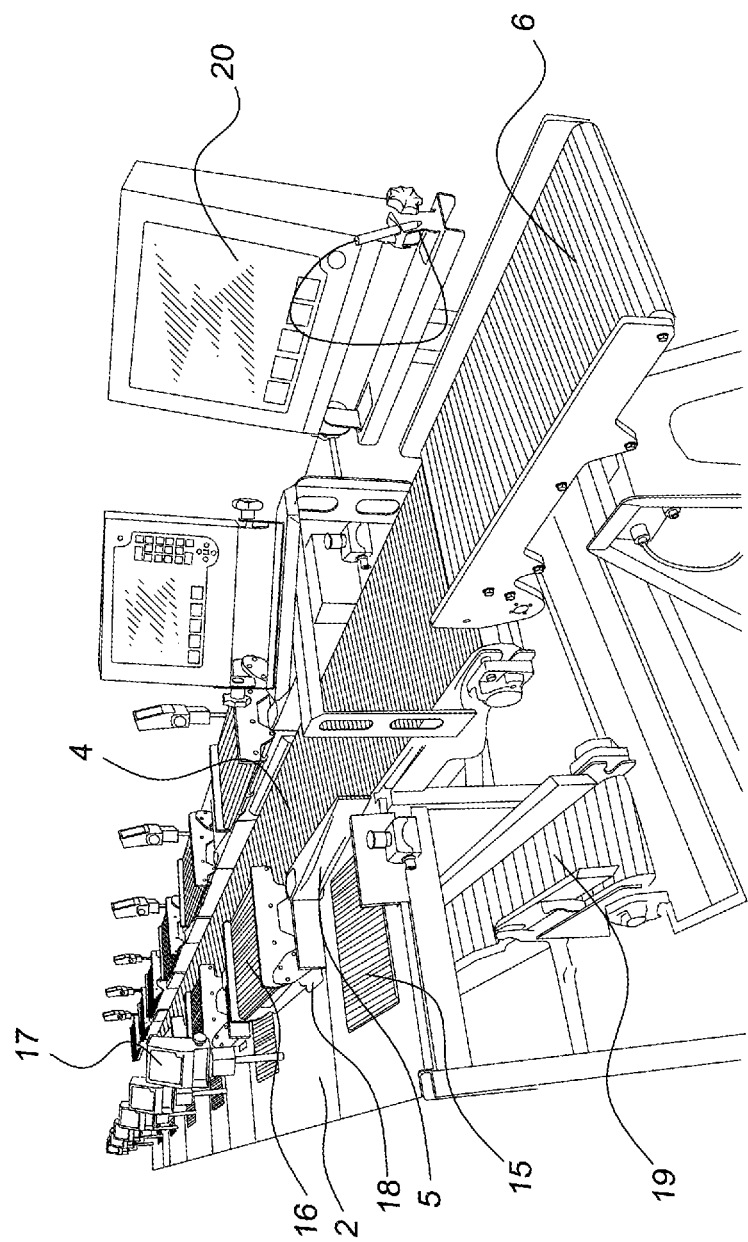

FIG. 10 is an overview of a food processing system comprising several of the workstations described in detail above with reference to FIGS. 7-9. The food processing system is depicted from the entrance end of the conveyor means 4, where also an initial characteristics determining device 6 is illustrated. Along the conveyor means 4, several workstations as described above are located on both sides. In FIG. 10 is clearly seen the end of a secondary conveyor means 19 for transporting away secondary processed items or waste. A computer system 20 is also shown in connection with the initial characteristics determining device 6. This computer system may be the central computer system referred to by numeral 8 in the above description, which controls the food processing system, but it can also merely comprise a display connected to the main computer system for displaying important information to a supervisor or control person, or simply the current status of the processing system or any other relevant information obtainable, e.g. yield figures, etc. The display, whether acting as main computer system 8 or simply as an input/output device, may also be used for planning the current and future batches or processing tasks, input information about the current operators and workstation configurations, etc., thereby facilitating better allocation of items for processing at the most relevant workstations. The initial characteristics determining device 6 is in the embodiment of the FIG. 10 of a type corresponding to the weight determining devices 16 at each workstation, however with a conveyor configuration specifically suited for the position at the entrance, handling every single item of the batch. As described above, any suitable initial characteristics determining device is within the scope of the present invention, e.g. scanners, sensors, etc.

Figure 11:
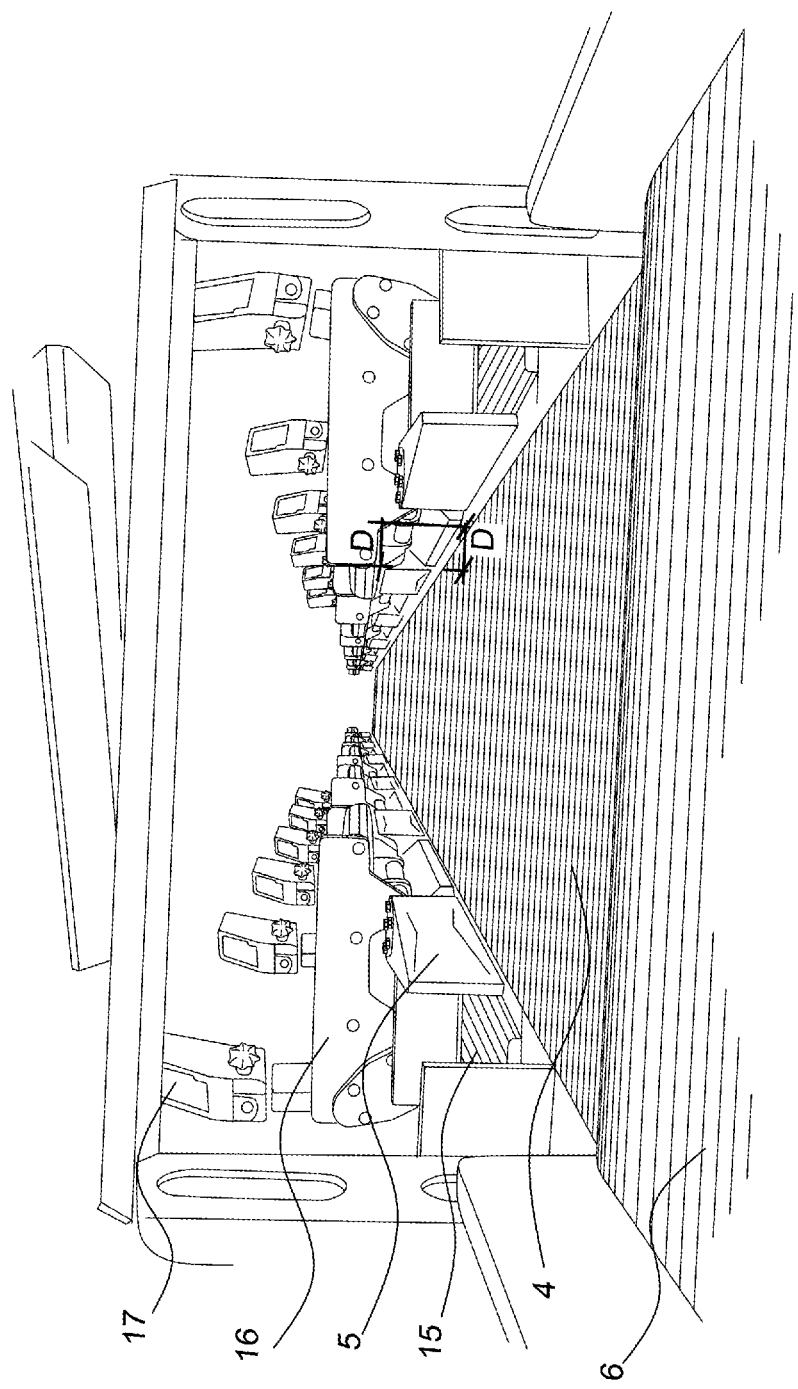

FIG. 11 is a look along the conveyor means 4 from the initial characteristics determining device 6 showing workstations on both sides. This view clearly illustrates the protrusion of the scale conveyors 16 out over the conveyor means 4 enabling processed items to be dropped on the conveyor means 4 a certain distance D from the edge of the conveyor means.

It is recognised that in addition to the embodiments shown in the drawings, several other configurations are within the scope of the present invention, including any combinations of the above described features and embodiments.

What is claimed is:

1. Method for processing food items, comprising the steps of:
    providing a stream of food items on a conveyor configured for servicing each one of a plurality of workstations;
    automatically selecting, via a computer system, one or more of the food items for transfer to a selected one of the workstations;
    transferring the selected one or more of the food items from the conveyor to said selected one of the workstations for processing by cutting and/or trimming the selected one or more of the food items into processed items, wherein others of the food items are transported past said selected one of the workstations by the conveyor;
    registering in the computer system the transfer of the selected one or more of the food items to said selected one of the workstations; and
    returning at least some of the processed items to the same conveyor for further transport.

2. The method of claim 1, wherein the selected one or more of the food items that are transferred to said selected one of the workstations are transferred in a serial manner, such that the processing of each one of the transferred food items occurs one at a time.

3. The method of claim 1, wherein at least some of the processed items are transported by said conveyor to a different one of the workstations for transfer to said different one of the workstations for further processing.

4. The method of claim 1, wherein at least some of the processed items returned to said conveyor are transported by said conveyor past one or more others of the workstations.

5. The method of claim 1, wherein the step of automatically selecting the one or more of the food items is based on a specific type of processing that is performed at said selected one of the workstations.

6. The method of claim 5, wherein the selected one or more of the food items that are transferred to said selected one of the workstations are transferred in a serial manner, such that the processing of each one of the transferred food items occurs one at a time.

7. The method of claim 5, wherein the step of automatically selecting the one or more of the food items is based on a specific type of processing that is performed at said selected one of the workstations.

8. The method of claim 5, wherein the selected one or more items are automatically transferred to said selected one of the workstations using a transfer device controlled by the computer system.

9. Method for processing food items, comprising the steps of:
    providing a stream of food items on a conveyor configured for servicing each one of a plurality of workstations;
    automatically selecting, via a computer system, one or more of the food items for transfer to a selected one of the workstations;
    transferring the selected one or more of the food items from the conveyor to said selected one of the workstations for processing by cutting and/or trimming the selected one or more of the food items into processed items, wherein others of the food items are transported past said selected one of the workstations by the conveyor;
    registering in the computer system the transfer of the selected one or more of the food items to said selected one of the workstations;
    returning at least some of the processed items to the same conveyor for transport by said conveyor to or past others of said workstations; and
    registering in the computer system the return of the processed items from said selected one of the workstations to said conveyor.

10. Method for processing food items, comprising the steps of:
    providing a stream of food items on a conveyor configured for servicing each one of a plurality of workstations;
    transporting, using said conveyor, at least a subset of the food items to one of the plurality of workstations;
    automatically transferring, using a transfer device controlled by a computer system, each one of said subset of food items from the conveyor to a first location at one of the workstations;
    processing each one of the transferred food items at said one of the workstations into one or more processed items by cutting and/or trimming, wherein
    at least one of the processed items are provided at a second location at said selected one of the workstations such that said second location is differently located than said first location; and
    returning the processed items to the same conveyor for further transport.

11. The method of claim 10, wherein the subset of food items are transported and transferred to said one of the workstations in a serial manner, such that the processing of each one of the transferred food items occurs one at a time.

12. The method of claim 10, wherein the processing of the transferred food items results in one or more additional processed items that are transferred to a third location different than the first and second locations.

13. The method of claim 10, wherein the processed items returned to said conveyor are transported by said conveyor to or past one or more others of the workstations.

14. The method of claim 10, further comprising a step of automatically selecting, using the computer system, each one of the subset of food items for transferring to the first location at said one of the workstations based on a specific type of processing that is performed at said one of the workstations.

15. Method for processing food items, comprising the steps of:
    providing a stream of food items on a conveyor configured for servicing each one of a plurality of workstations;
    automatically transferring, using a transfer device controlled by a computer system, one or more of the food items from the conveyor to a first location at one of the workstations, wherein others of the food items are transported past said one of the workstations by the conveyor;
    processing the transferred one or more of the food items by cutting and/or trimming the transferred food items at said one of the workstations into processed items, wherein
    at least one of the processed items are provided at a second location at said selected one of the workstations such that said second location is differently located than said first location; and
    returning the processed items to the same conveyor for further transport.

16. The method of claim 15, wherein the processed items returned to said conveyor are transported by said conveyor to or past one or more others of the workstations.

17. The method of claim 15, further comprising a step of automatically selecting the one or more of the food items for transferring to said first location at said one of the workstations based on a specific type of processing that is performed at said one of the workstations.

18. The method of claim 15, wherein the transferred food items are transported and transferred to said one of the workstations in a serial manner, such that the transfer of the one or more of the food items occurs one at a time.

19. The method of claim 18, wherein the processing of each one of the transferred food items results in one or more additional processed items that are transferred to a third location different than the first and second locations.

20. Method for processing food items, comprising the steps of:
provet   providing a stream of food items on a conveyor configured for servicing each one of a plurality of workstations;
   automatically selecting, via a computer system, some of the food items for transfer to a selected one of the workstations;
   automatically transferring, using a transfer device controlled by the computer system, the selected one or more of the food items from the conveyor to a first location at said selected one of the workstations, wherein others of the food items are transported past said selected one of the workstations by the conveyor;
   processing, one at a time, each one of the selected food items at the selected one of the workstations by cutting and/or trimming each one of the selected food items into at least one processed item;
   for at least some of the processed food items, moving, at least one of the processed items to a second location at said selected one of the workstations, said second location differently located than said first location; and
   returning the moved processed items to the same conveyor for transport to or past one or more others of said workstations.

21. The method of claim 20, wherein at least some of the processed items that were not moved to the second location are transferred to a third location different than the first and second locations.

22. The method of claim 20, wherein the computer system performs the step of automatically selecting the one or more of the food items based on a specific type of processing that is performed at said selected one of the workstations.

23. The method of claim 20, wherein at least some of the processed items returned to said conveyor are transported by said conveyor to a different one of the workstations for transfer to said different one of the workstations for further processing.

24. Method for processing food items, comprising the steps of:
   providing a stream of food items on a conveyor configured for servicing each one of a plurality of workstations;
   transporting at least a subset of the food items to or past at least one of the workstations;
   automatically selecting, via a computer system, one or more of said subset of food items for transfer to said one of the workstations;
   automatically transferring, using a transfer device controlled by the computer system, the selected one or more of the food items from the conveyor to a first location at said one of the workstations, wherein others of the subset of food items are transported past said one of the workstations by the conveyor;
   registering in the computer system the transfer of the selected one or more of the food items to said one of the workstations;
   processing by cutting and/or trimming the selected one or more of the food items at said selected one of the workstations into processed items;
   moving at least some of the processed items to a second location at said selected one of the workstations, said second location differently located than said first location;
   returning the moved processed items to the same conveyor for transport to or past one or more others of said workstations; and
   registering in the computer system the return of the processed items from said selected one of the workstations to said conveyor.

25. The method of claim 24, wherein at least some of the processed items that were not moved to said second location are transferred to a third location different than the first and second locations.

26. The method of claim 24, wherein the computer system performs the step of automatically selecting the one or more of the food items based on a specific type of processing that is performed at said selected one of the workstations.

27. The method of claim 24, wherein at least some of the processed items returned to said conveyor are transported by said conveyor to a different one of the workstations for transfer to said different one of the workstations for further processing.

* * * * *